United States Patent [19]

Marsh et al.

[11] Patent Number: 5,346,291
[45] Date of Patent: Sep. 13, 1994

[54] FLUID PRESSURE CONTROL VALVE WITH VALVE MEMBER MOUNTED ON GUIDE PIN SLIDABLY CARRIED BY PISTON

[75] Inventors: Andrew Marsh, Elyria; Bruce E. Latvala, Grafton, both of Ohio

[73] Assignee: Allied-Signal Inc., Morristown, N.J.

[21] Appl. No.: 984,409

[22] Filed: Dec. 2, 1992

[51] Int. Cl.$^5$ ............................................. F16B 13/02
[52] U.S. Cl. ......................................... 303/28; 132/627.5; 303/40
[58] Field of Search .................. 137/627.5, 102, 107; 303/7, 13, 14, 29, 40

[56] References Cited

U.S. PATENT DOCUMENTS

| | | | |
|---|---|---|---|
| 3,001,831 | 9/1961 | Stelzer | 303/40 |
| 3,169,804 | 2/1965 | Bueler et ala. | 137/627.5 |
| 3,285,674 | 11/1966 | Eaton | 303/40 |
| 3,460,872 | 8/1969 | Reno et al. | 303/40 |
| 3,464,742 | 9/1969 | Cruse | 137/627.5 |
| 3,479,096 | 11/1969 | Cruse | 137/627.5 |
| 3,549,208 | 12/1970 | Cruse | 137/627.5 |
| 3,744,848 | 7/1973 | Hardwick et al. | 137/107 |
| 3,837,361 | 9/1974 | Urban et al. | 137/627.5 |
| 3,857,614 | 12/1974 | Kurichh | 303/40 |
| 3,920,045 | 11/1975 | Horowitz et al. | 137/627.5 |
| 3,937,975 | 2/1976 | Yanagawa et al. | 303/40 |
| 3,971,596 | 7/1976 | Grix | 303/40 |
| 4,453,779 | 6/1984 | Bridigum | 303/40 |
| 4,502,351 | 3/1985 | Gates et al. | 137/102 |
| 4,712,577 | 12/1987 | Angelillo | 137/627.5 |
| 4,924,901 | 5/1990 | Valavaara | 137/627.5 |
| 5,065,665 | 11/1991 | Kimura | 137/627.5 |

FOREIGN PATENT DOCUMENTS

| | | | |
|---|---|---|---|
| 2545572 | 11/1984 | France | 137/627.5 |
| 349989 | 10/1972 | Sweden | |
| 1459686 | 12/1976 | United Kingdom | |

*Primary Examiner*—Matthew C. Graham
*Attorney, Agent, or Firm*—Ken C. Decker

[57] ABSTRACT

A fluid pressure responsive valve includes a valve member mounted on a guide pin slidably carried by a piston. A valve guide is engaged by one side of the valve element, and the piston engages the opposite side. The piston controls the valve member. The valve guide acts as a stop for a check valve element that controls communication through the inlet port, and also guides and supports the spring controlling the check valve element.

15 Claims, 2 Drawing Sheets

FLUID PRESSURE CONTROL VALVE WITH VALVE MEMBER MOUNTED ON GUIDE PIN SLIDABLY CARRIED BY PISTON

This invention relates to a fluid pressure control valve.

Fluid pressure control valves are often used in, for example, vehicle braking systems to control other components of the system. Particularly in automotive braking systems, it is desirable that these valves be as small as possible, and it is also desirable that the valve be resistant to malfunction caused by contaminants entrained in the fluid. Such valves include many rubber components, and such rubber components are commonly guided along their outer diameter. Accordingly, contaminants entrained in the fluid supply often react with the rubber, causing swelling and therefore a valve malfunction. Accordingly, the valve components must be larger than otherwise would be necessary, and the rubber components must be bonded to metal in order to resist swelling. Furthermore, contaminants may block passages that are too small.

The valve according to the present invention is designed for use as a component of a trailer air brake system. Reservoirs on the trailer are charged through the valve, which automatically effects a service brake application as the reservoirs are being charged until the pressure in the reservoirs attains a predetermined pressure level, whereupon the service actuation is released.

According to the present invention, a relatively simple rubber valve member is supported on a guide pin between a valve guide and a pressure responsive piston. The guide pin extends into an exhaust passage that extends through the piston, thereby automatically cleaning the exhaust passage during normal operation of the valve. A valve guide engages a surface of a valve member opposite the surface engaged by the piston, and extends toward a check valve element which controls communication through the inlet to the valve mechanism, thereby also serving as a spring guide for the spring controlling the check valve element and also as a stop for limiting movement of the check valve element.

Accordingly, a valve is provided which is substantially smaller than prior art valves, and is resistant to contamination, since the smallest passage is continually cleaned by the guide pin and the rubber valve member is guided by the guide pin instead of an outside diameter, so that swelling of the rubber will not affect valve performance.

BRIEF DESCRIPTION OF THE DRAWINGS

These and other advantages of the present invention will become apparent from the following description, with reference to the accompanying drawings, in which.

DETAILED DESCRIPTION OF THE DRAWINGS

Figure 1:
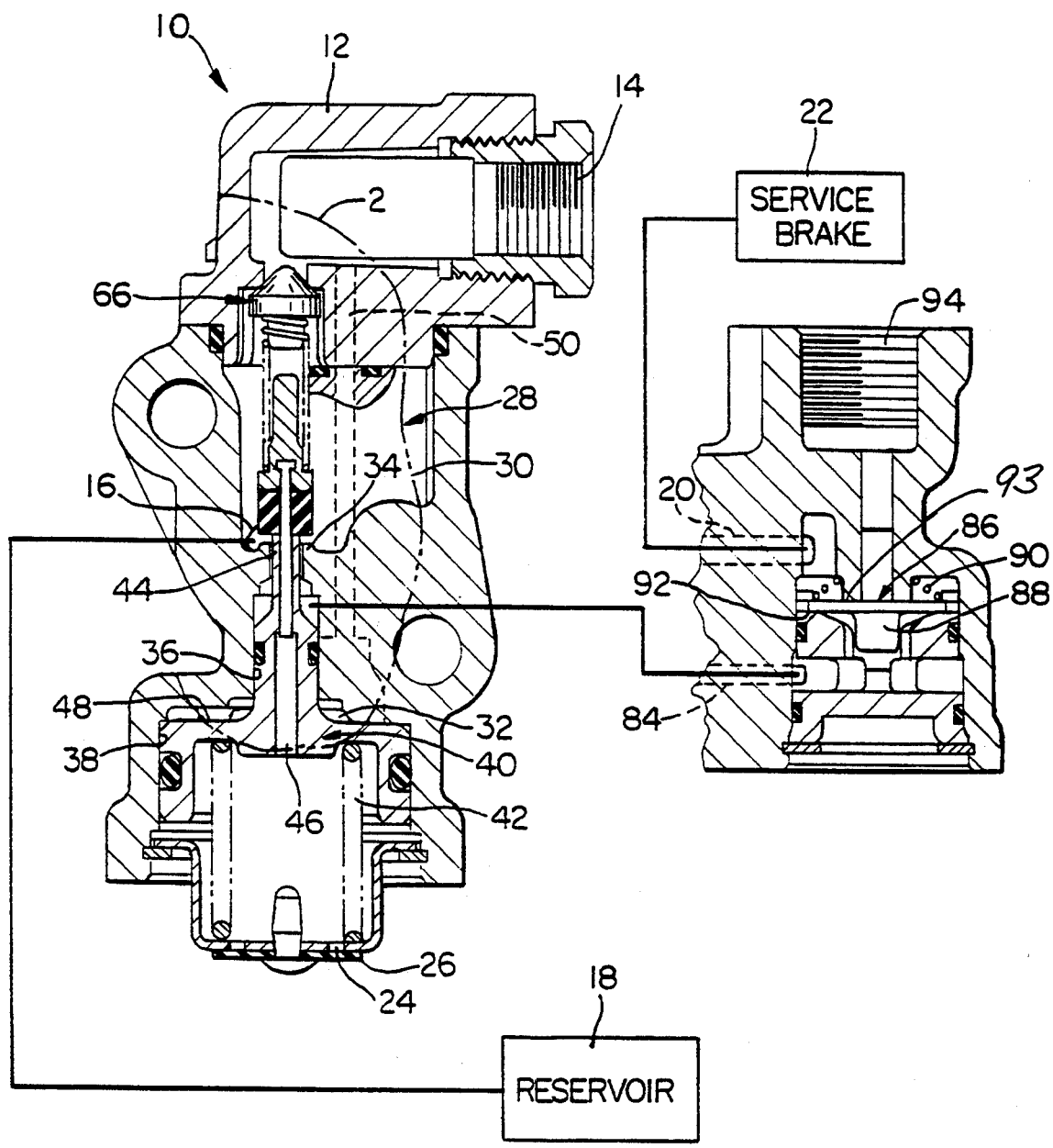
FIG. 1 is a schematic illustration of the components of a braking system including a valve according to the present invention, which is illustrated in cross-section.
Figure 2:
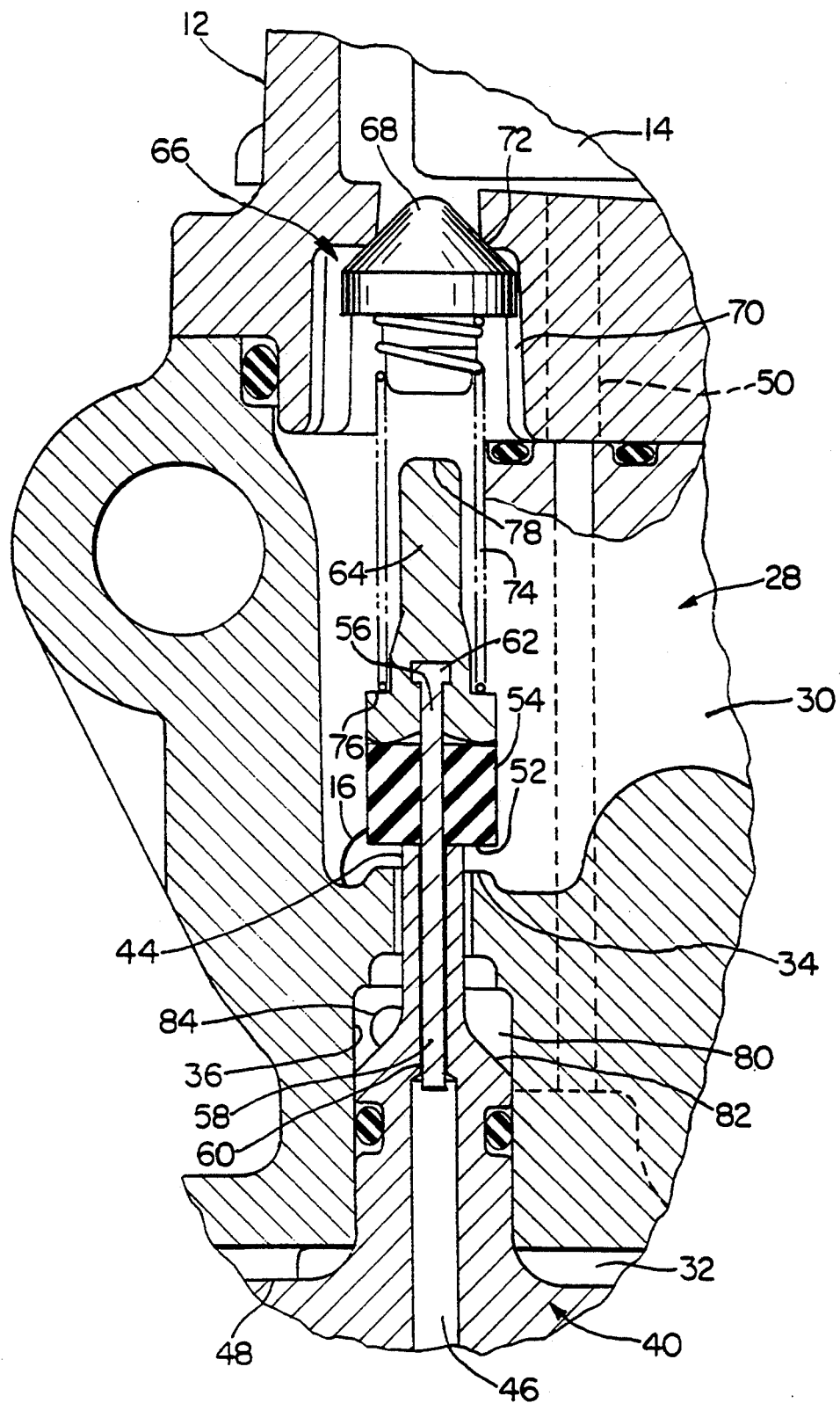
FIG. 2 is an enlarged view of the circumscribed portion of FIG. 1.

Referring now to the drawings, a fluid pressure responsive valve generally indicated by the numeral 10 includes a housing 12 having an inlet port 14, which is connected to the trailer supply line if the valve 10 is used in a trailer braking system. Housing 12 further includes and outlet opening 16, which is communicated to trailer reservoirs generally indicated at 18. The housing 12 further includes an outlet port 20 which is connected to service brake application effecting means generally indicated by the numeral 22. The service brake effecting means 22 may be, for example, a conventional relay valve which responds to a fluid pressure signal at the port 20 to effect a service brake application. Housing 12 further includes an exhaust port 24 which is closed by conventional flapper valve 26.

The housing 12 defines a chamber 28 therewithin which is divided into an inlet section 30 and an outlet section 32 by valve seat 34. Outlet section 32 is stepped to define a smaller diameter portion 36 and a larger diameter portion 38. A stepped piston 40 has corresponding smaller and larger diameter sections that are slidably and sealably received within the smaller diameter portion 36 and larger diameter portion 38 of the section 32 of the chamber 28. A spring 42 yieldably urges the piston 40 upwardly, viewing the Figure, such that upper end 44 of the piston 40 extends through the valve seat 34. An exhaust passage 46 extends through the stepped piston 40 and communicates with the exhaust port 24. A shoulder 48 is defined between the larger and smaller diameter portions of the piston 40, and defines a fluid pressure responsive surface which is communicated directly to inlet port 14 through passage 50.

The upper end 44 of the piston 40 terminates in a valve seat which is sealingly engaged by end 52 of a valve member 54 to prevent communication from section 30 of chamber 28 into the exhaust passage 46. The valve member 54 is mounted on a guide pin 56, one end 58 of which is slidably received in reduced diameter portion 60 of the passage 46. The opposite end 62 of the guide pin 56 is formed integrally with a coaxial valve guide 64. Communication of fluid pressure into the section 30 from the inlet port 14 is controlled by a check valve assembly generally indicated by the numeral 66. Check valve assembly 66 includes a valve element 68 which is guided on its outer diameter by flutes 70, and which is urged into sealing engagement with its valve seat 72 by a spring 74 which is disposed between the valve element 68 and a shoulder 76 on the valve guide 64. The upper end 78 of the valve guide 64 acts as a stop for valve element 68 to limit downward movement of the latter.

The portion 80 of outlet section 32 defined between the circumferentially extending surface 82 on the smaller diameter portion of the piston 40 and the valve seat 34 is communicated to service brake actuator 22 through outlet port 20. The portion 80 is communicated to the outlet port 20 through passage 84 and a check valve assembly generally indicated by the numeral 86. The check valve assembly 86 includes a hat-shaped valve element 88 and a spring 90 which urges the valve element 88 against the seating area 92. As pressure increases in passage 84, center portion of valve element 88 moves to sealingly engage valve seat 93. When pressure in passage 84 increases by an amount sufficient to deflect the spring 90, pressure flows to the outlet port 20. However, when pressure in passage 84 drops sufficiently, pressure at outlet port 20 exhausts through exhaust port 94 to atmosphere.

In operation, the various components of the valve 10 are illustrated in positions which they occupy when pressure in reservoir 18 is nearly depleted. Pressure received at inlet port 14 opens the check valve assembly 66 and flows into inlet section 30 of chamber 28. Pressure is prevented from flowing into exhaust passage 46 due to the sealing engagement of surface 52 with the end of 44 of the stepped piston 40. Pressure then flows through outlet opening 16 to the reservoir 18, and also flows through passage 84, through the check valve assembly 86 and outlet port 20 to the service brake actuating means 22, to thereby effect a service brake application while the reservoirs 18 are being charged. At the same time, pressure at inlet port 14 is communicated to the fluid pressure responsive surface 48 on stepped piston 40 through the passage 50. When the force of fluid pressure acting on fluid pressure responsive surface 48 attains a predetermined level sufficiently to overcome the force of spring 42, piston 40 moves downwardly, viewing the Figures, thereby permitting the end 52 of valve element 54 to sealingly engage the valve seat 34 in response to the action of the spring 74 and fluid pressure in the inlet section 30.

Additional downward movement of the piston 40 urges end 44 of the piston away from the sealing surface 52, thereby opening communication between the portion 80 of the outlet section 32 to the exhaust passage 46 and therefore to atmosphere through the exhaust port 24. Communication of the passage 84 to atmosphere causes the higher pressure then existing at outlet port 20 to force the valve element 88 into sealing engagement with seat 92, thereby exhausting pressure from the service brake actuation effecting means 22 to atmosphere through exhaust port 94, thereby releasing the service actuation and permitting the vehicle to be moved, as the pressure in reservoir 18 has now attained a level sufficient to permit safe operation of the vehicle. The reservoirs 18, however, will continue to be charged until the reservoirs reach full system pressure due to the fact that the outlet opening 16 continues to communicate pressure to the reservoirs until the pressure in the reservoir attains system pressure, whereupon the check valve assembly 66 closes to prevent communication out of the reservoirs to the inlet port 14 in case the pressure at inlet port 14 is vented. Pressure at port 14 is vented, for example, when the trailer supply line breaks or is disconnected. When this occurs, pressure in section 32 is also vented, permitting the spring 42 to urge the piston 40 upwardly viewing the Figures to again establish communication between opening 16 and passage 84. Fluid pressure deflects valve 88 to communicate to service brake application effecting means to effect a trailer service brake application.

The various components of the valve 10 are specifically designed to minimize cost, resist contamination, and to provide a valve of minimum size. The guide pin 56 is slidably received in the smallest portion 60 of the exhaust passage 46. Because of the relative movements between the piston 40 and the guide pin 56 during the normal operation of the valve, the exhaust passage 46 is self-cleaning. Furthermore, the guide pin 56 mounts the valve element 54, instead of the valve element 54 being guided on outer diameter as in prior art devices. Accordingly, the operation of the valve 10 is not sensitive to swelling of the valve element 54, so that the valve element 54 need not be a bonded element and may be made significantly smaller than would otherwise be necessary. The valve guide 64 performs multiple functions including limiting and controlling movement of the valve element 54, providing a seat for the spring 74, and providing a stop for the check valve element 68.

We claim:

1. Fluid pressure responsive valve comprising a housing having an inlet port, an outlet port, and an exhaust port, said housing defining a chamber therewithin communicating said ports with one another, said chamber being defined by a wall of said housing, a valve seat defined on said chamber, a piston slidably mounted in said chamber, said piston including a portion extending through said valve seat, and a valve member carried on said portion of the piston, said valve member being mounted on and guided by a guide pin carried by said piston and slidable with respect thereto and also being separated from the wall defining said chamber, a spring yieldably urging said piston toward a position holding said valve member away from said valve seat, said piston including a fluid pressure responsive surface responsive to fluid pressure at said inlet port to move away from said valve seat to thereby permit said valve member to sealingly engage said valve seat, said piston thereafter moving away from said valve member.

2. Fluid pressure responsive valve as claimed in claim 1, wherein said piston defines an exhaust passage extending therethrough communicating with said exhaust port, said valve seat dividing said chamber into a pair of sections, said exhaust passage communicating one of said sections to the exhaust port after said piston moves away from said valve member upon engagement of the valve member with said valve seat.

3. Fluid pressure responsive valve as claimed in claim 2, wherein said guide pin is slidably received in said exhaust passage.

4. Fluid pressure responsive valve as claimed in claim 2, wherein a check valve controls communication through said inlet port to permit communication into said chamber, said check valve including a check valve element substantially coaxial with said piston.

5. Fluid pressure responsive valve as claimed in claim 4, wherein said valve member is engaged by said piston and by a valve guide, said guide pin extending through the valve member and being secured to said valve guide.

6. Fluid pressure responsive valve as claimed in claim 5, wherein said check valve includes a check valve spring yieldably urging said check valve element into sealing engagement with a check valve seat carried by said housing, said check valve spring extending between a shoulder on said valve guide and said check valve element whereby said valve guide orients and guides said check valve spring.

7. Fluid pressure responsive valve as claimed in claim 6, wherein said valve guide terminates in an end disposed a predetermined distance from said check valve element, said end engaging said check valve element to limit deflection of the check valve element to a predetermined distance.

8. Fluid pressure responsive valve as claimed in claim 7, wherein said guide pin is slidably received in said exhaust passage.

9. Fluid pressure responsive valve as claimed in claim 2, wherein said outlet port communicates with said one section through a one-way check valve.

10. Fluid pressure responsive valve as claimed in claim 2, wherein said housing includes an outlet opening communicating with the other of said sections.

11. Fluid pressure responsive valve comprising a housing having an inlet port, an outlet port, and an exhaust port, said housing defining a chamber therewithin communicating said ports with one another, said chamber being defined by a wall of said housing, a valve seat defined on said chamber, a piston slidably mounted in said chamber, said piston including a portion extending through said valve seat, a valve member carried on said portion of the piston, a spring yieldably urging said piston toward a position holding said valve member away from said valve seat, said piston including a fluid pressure responsive surface responsive to fluid pressure at said inlet port to move away from said valve seat to thereby permit said valve member to sealingly engage said valve seat, said piston thereafter moving away from said valve member, a valve guide engaging one end of said valve member, a check valve controlling communication through said inlet port to permit communication into said chamber, said check valve including a check valve element substantially coaxial with said piston, said valve guide terminating in an end disposed a predetermined distance from said check valve element, said end engaging said check valve element to limit deflection of the check valve element to a predetermined distance.

12. Fluid pressure responsive valve as claimed in claim 11, wherein said piston defines an exhaust passage extending therethrough communicating with said exhaust port, said valve seat dividing said chamber into a pair of sections, said exhaust passage communicating one of said sections to the exhaust port after said piston moves away from said valve member upon engagement of the valve member with said valve seat.

13. Fluid pressure responsive valve as claimed in claim 11, wherein said check valve includes a check valve spring yieldably urging said check valve element into sealing engagement with a check valve seat carried by said housing, said check valve spring extending between a shoulder on said valve guide and said check valve element whereby said valve guide orients and guides said check valve spring.

14. Fluid pressure responsive valve as claimed in claim 13, wherein said outlet port communicates with said one section through a one-way check valve.

15. Fluid pressure responsive valve as claimed in claim 13, wherein said housing includes an outlet opening communicating with the other of said sections.

* * * * *